(12) United States Patent
Elder et al.

(10) Patent No.: US 9,010,077 B2
(45) Date of Patent: Apr. 21, 2015

(54) RIDING LAWN MOWER WITH FRICTION DRIVE

(71) Applicant: Husqvarna AB, Huskvarna (SE)

(72) Inventors: Matthew Elder, Orangeburg, SC (US); Justin Warner, Milford, MI (US); Warren Pendry, Orangeburg, SC (US); Eric Canonage, Charlotte, NC (US); Jeffrey C. Hickman, Concord, NC (US); Lennie D. Rhoades, Charlotte, NC (US); Roger J. Leon, Mooresville, NC (US); David Bonner, Knoxville, TN (US); Darren Chandler, Orangeburg, SC (US); James F. Dayton, Jr., Charleston, SC (US); Jake Fiser, Lexington, SC (US); Travis Lyons, Mount Holly, NC (US); Brad Graham, Summerville, SC (US); Duncan K. Burns, Jr., Charlotte, NC (US); David Hypes, Salem, IN (US)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 13/714,732

(22) Filed: Dec. 14, 2012

(65) Prior Publication Data
US 2013/0097984 A1 Apr. 25, 2013

Related U.S. Application Data

(63) Continuation of application No. PCT/US2010/038831, filed on Jun. 16, 2010.

(51) Int. Cl.
*A01D 69/10* (2006.01)
*A01D 34/76* (2006.01)
(Continued)

(52) U.S. Cl.
CPC ............... *A01D 34/76* (2013.01); *A01D 34/64* (2013.01); *A01D 69/08* (2013.01)

(58) Field of Classification Search
USPC ............. 56/11.7, 11.8, 12.6, 16.9, 11.2–11.5; 476/16, 17, 23, 24
See application file for complete search history.

(56) References Cited

U.S. PATENT DOCUMENTS

| 2,448,074 A | 8/1948 | Bishop |
| 2,743,565 A * | 5/1956 | Dow ............................... 56/11.2 |
| 2,859,579 A | 11/1958 | Peck |

(Continued)

FOREIGN PATENT DOCUMENTS

| CN | 2380002 Y | 5/2000 |
| CN | 1800606 A | 7/2006 |

(Continued)

OTHER PUBLICATIONS

International Search Report and Written Opinion of PCT/US2010/038831 mailed Feb. 28, 2011.

(Continued)

*Primary Examiner* — Alicia Torres
(74) *Attorney, Agent, or Firm* — Nelson Mullins Riley & Scarborough LLP

(57) ABSTRACT

A riding lawn mower may include a cutting deck coupled to a cutting blade, an engine, a deck drive coupled to the engine to receive power for operating the cutting blade, a ground drive coupled to the engine to receive power for movement of the riding lawn mower over ground, and a friction drive coupling the deck drive to the engine.

20 Claims, 14 Drawing Sheets

(51) Int. Cl.
*A01D 34/64* (2006.01)
*A01D 69/08* (2006.01)

(56) References Cited

U.S. PATENT DOCUMENTS

| | | | |
|---|---|---|---|
| 3,059,397 A * | 10/1962 | Anderson et al. | 56/16.2 |
| 3,077,065 A | 2/1963 | Samways et al. | |
| 3,327,546 A * | 6/1967 | Gordon et al. | 476/24 |
| 3,529,482 A * | 9/1970 | Hanson, Jr. et al. | 476/24 |
| 3,570,637 A | 3/1971 | Pitman et al. | |
| 3,667,304 A * | 6/1972 | Puffer et al. | 476/66 |
| 3,678,770 A * | 7/1972 | Enters et al. | 476/19 |
| 3,839,919 A * | 10/1974 | Mollen et al. | 476/30 |
| 4,016,709 A | 4/1977 | Hauser et al. | |
| 4,037,389 A | 7/1977 | Harkness | |
| 4,058,957 A | 11/1977 | Roseberry | |
| 4,313,293 A | 2/1982 | Nagai | |
| 4,318,266 A | 3/1982 | Taube | |
| 4,498,552 A * | 2/1985 | Rouse | 180/368 |
| 4,580,669 A * | 4/1986 | Marto | 192/3.54 |
| 4,642,976 A | 2/1987 | Owens | |
| 4,739,850 A * | 4/1988 | Fujioka | 180/19.3 |
| 5,146,735 A | 9/1992 | McDonner | |
| 5,367,861 A | 11/1994 | Murakawa et al. | |
| 5,526,635 A | 6/1996 | Wilder, Jr. | |
| 5,797,251 A | 8/1998 | Busboom | |
| 6,223,510 B1 | 5/2001 | Gillins et al. | |
| 6,230,608 B1 * | 5/2001 | Schaedler et al. | 91/445 |
| 6,346,060 B1 | 2/2002 | Shimizu et al. | |
| 6,625,966 B2 | 9/2003 | Kaneyuki et al. | |
| 7,028,456 B2 | 4/2006 | Thatcher et al. | |
| 2007/0095040 A1 | 5/2007 | Berkeley | |
| 2009/0293439 A1 | 12/2009 | Phillips | |

FOREIGN PATENT DOCUMENTS

| | | |
|---|---|---|
| CN | 1820564 A | 8/2006 |
| CN | 201051788 Y | 4/2008 |
| CN | 201290246 Y | 8/2009 |
| EP | 0981944 A1 | 3/2000 |

OTHER PUBLICATIONS

Chapter I International Preliminary Report on Patentability of PCT/US2010/038831 mailed Dec. 19, 2012.

Non-Final Office Action in U.S. Appl. No. 13/714,717 mailed Dec. 18, 2013, all enclosed pages cited.

Restriction Requirement in U.S. Appl. No. 13/714,717 mailed Nov. 1, 2013, all enclosed pages cited.

* cited by examiner

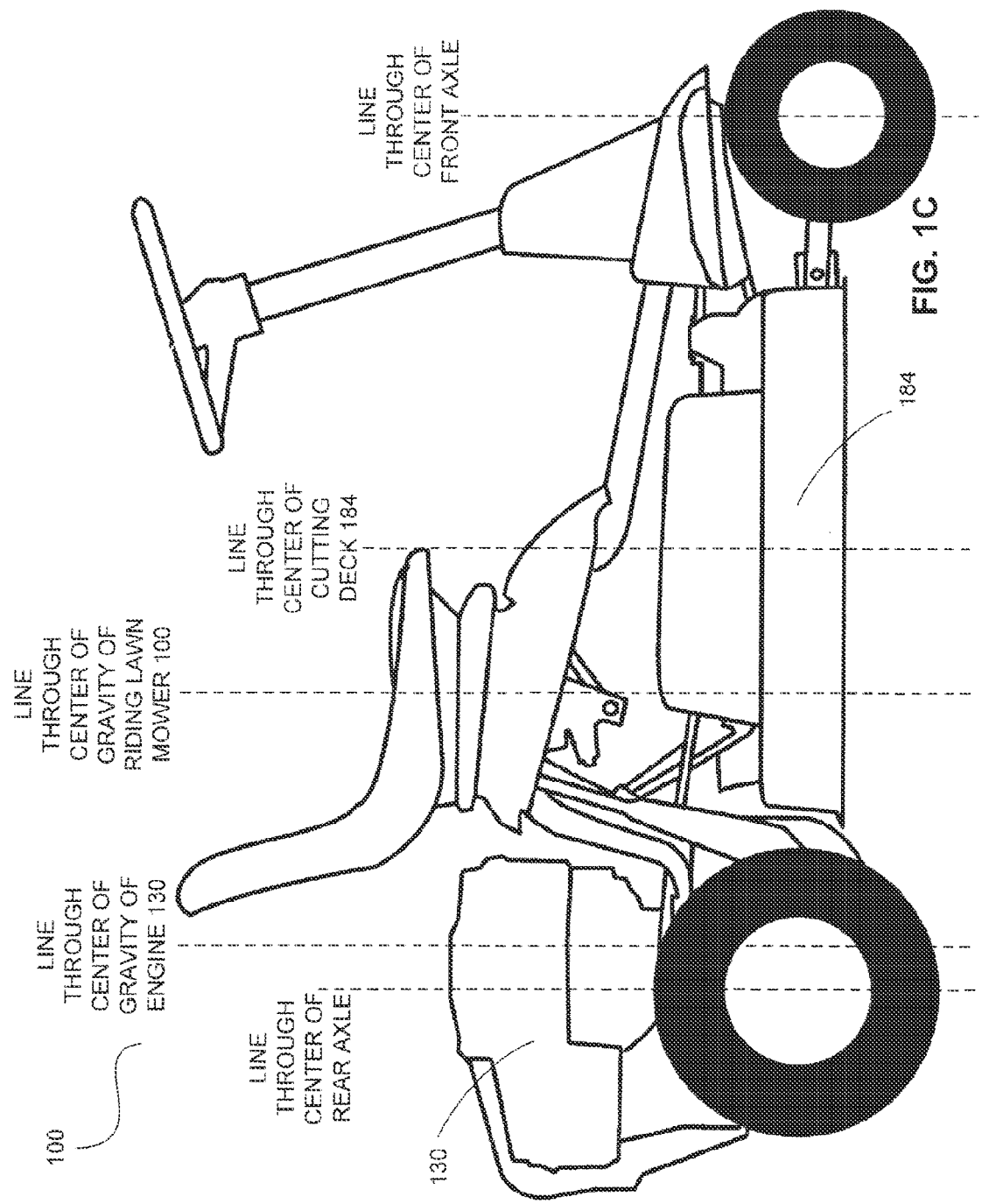

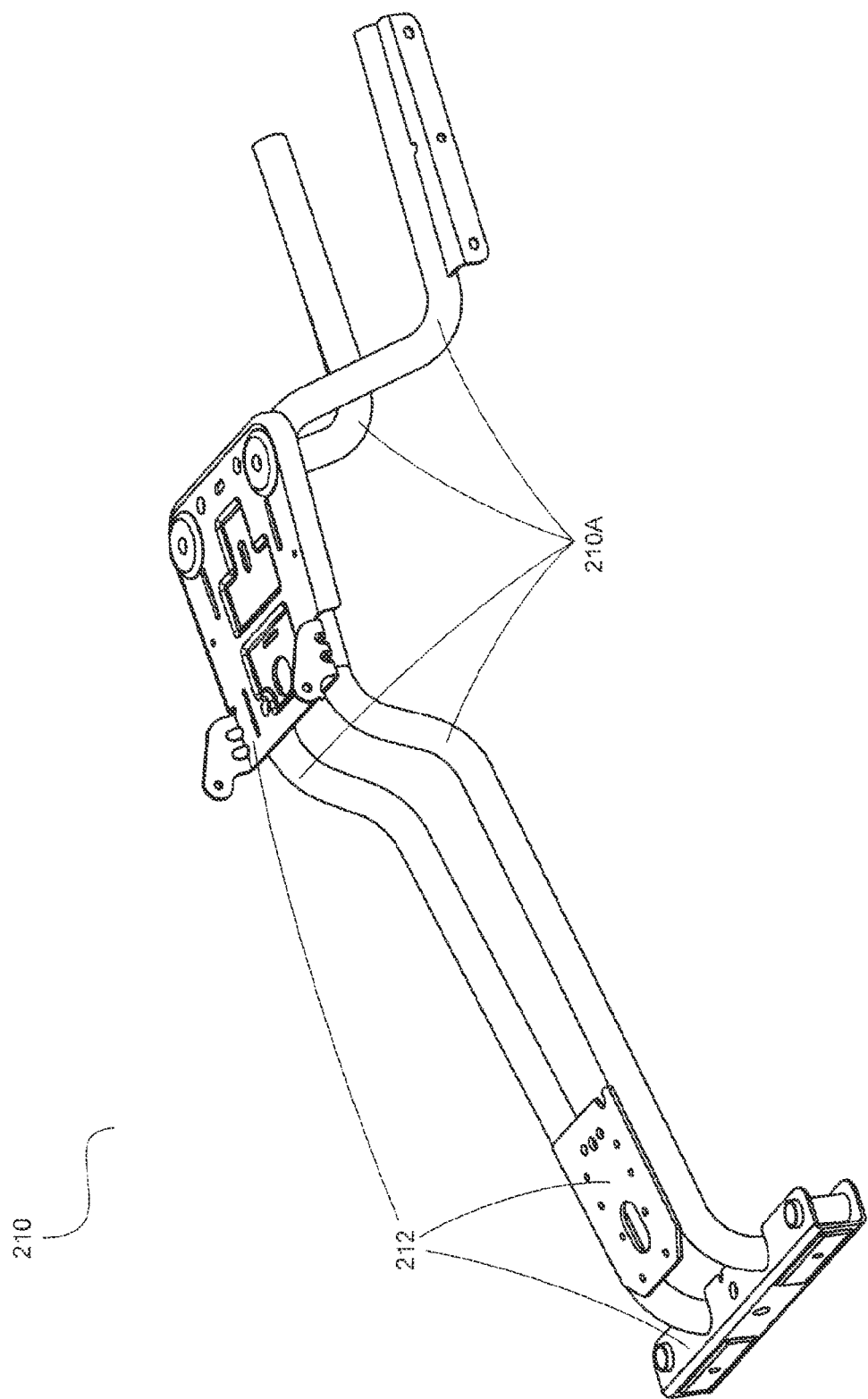

US 9,010,077 B2

RIDING LAWN MOWER WITH FRICTION DRIVE

CROSS REFERENCE TO RELATED APPLICATIONS

This application is a continuation of International Application PCT/US2010/038831, filed Jun. 16, 2010, the contents of which are incorporated herein in their entirety.

TECHNICAL FIELD

The present disclosure relates to vehicles, and in particular, to vehicles configured for lawn maintenance including mowing.

BACKGROUND

Grass is commonly maintained with lawn care machinery such as, for example, lawn mowers, lawn tractors, and/or the like. Walk-behind lawn mowers are often compact and inexpensive, and are usually configured with comparatively small engines of less than about 200 cubic centimeters (cc). At the other end of the spectrum, ride-on lawn tractors can be quite large, have engine sizes generally exceeding 400 cc, and can be configured with various functional accessories (e.g., trailers, tillers, and/or the like) in addition to grass cutting components. Riding lawn mowers often fall in the middle, providing the convenience of a riding vehicle as well as a typically larger cutting deck as compared to a walk-behind lawn mower.

However, prior riding lawn mowers have been unable to overcome various difficulties. For example, certain prior lawn mowers have required large, expensive engines in order to obtain sufficient operative power to carry a rider and/or to drive a desired size of cutting deck. Other riding lawn mowers have been expensive, having prices similar to prices of lawn tractors. Yet other riding lawn mowers have been undesirably large when boxed or otherwise configured for transportation and/or sale, limiting the types of vehicles that may be used to transport the lawn mower to a desired location (for example, from a retail store to the home of a purchaser).

SUMMARY

This disclosure relates to systems and methods for riding lawn mowers and components thereof. In an exemplary embodiment, a riding lawn mower comprises a cutting deck coupled to a cutting blade, and an internal combustion engine having a displacement of less than 225 cubic centimeters. The internal combustion engine is coupled to the cutting blade via a friction drive.

In another exemplary embodiment, a drivetrain for a riding lawn mower comprises a friction wheel, and an engine flywheel coupled to a deck drive. The engine flywheel is frictionally engageable with the friction wheel, and the flywheel comprises a neutral bearing centrally located thereon. The drivetrain further comprises a differential comprising at least one plastic gear. The differential is coupled to the friction wheel in order to transfer power to at least one drive wheel of the riding lawn mower.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 1C illustrates configuration of an engine with respect to an exemplary riding lawn mower in accordance with an exemplary embodiment;

FIG. 2 illustrates an exemplary riding lawn mower frame in accordance with an exemplary embodiment;

DETAILED DESCRIPTION

Figure 1A:
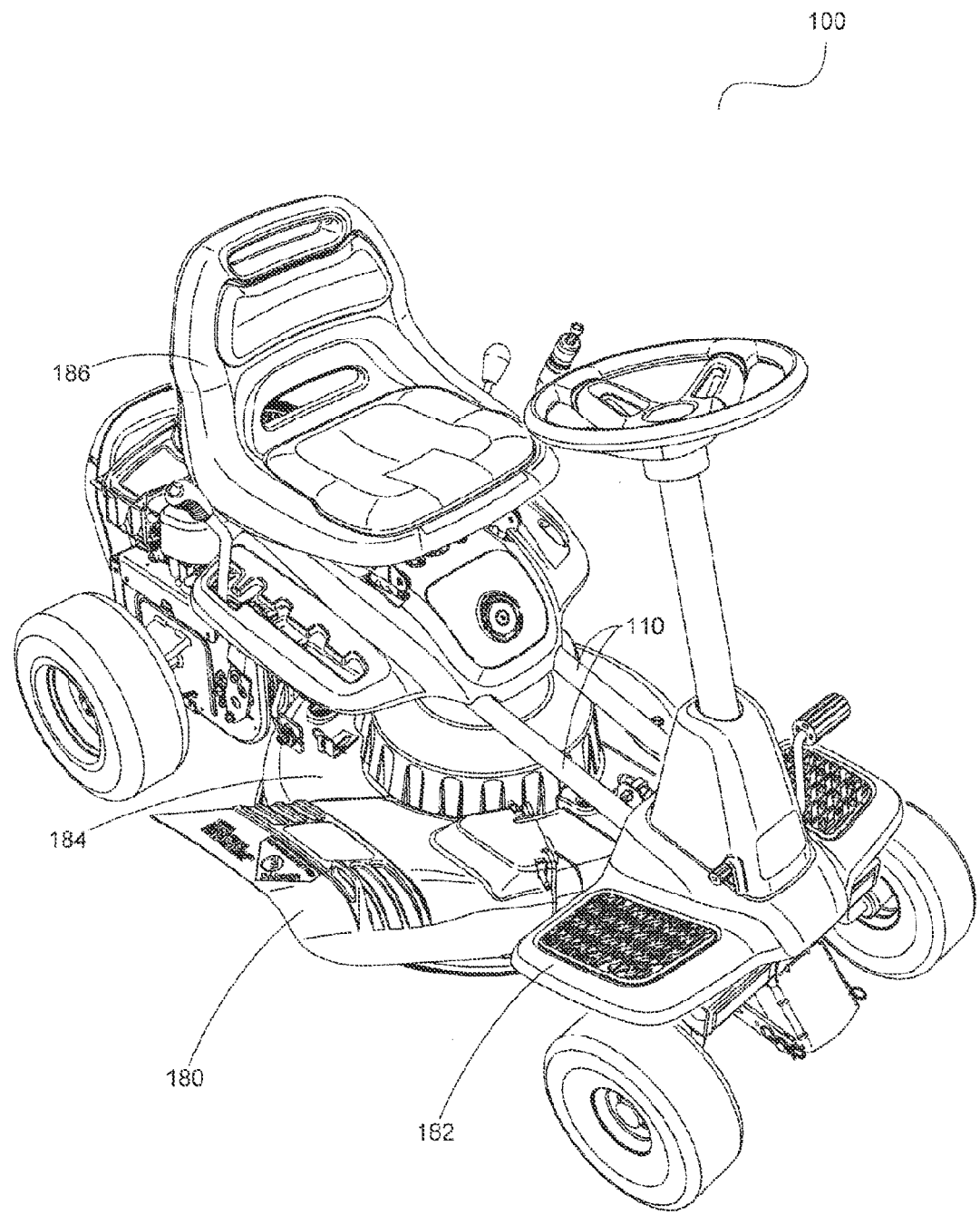
FIG. 1A illustrates an exemplary riding lawn mower in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical light riding vehicle, for example a riding lawn mower.

Principles of the present disclosure reduce and/or eliminate problems with prior riding lawn mowers. For example, various riding lawn mowers configured in accordance with principles of the present disclosure are configured to utilize smaller and/or less expensive engines, for example engines having displacement of up to 224 cc. Other riding lawn mowers configured in accordance with principles of the present disclosure are configured to be smaller and/or lighter than certain prior riding lawn mowers in order to, for example, be able to fit in certain common passenger vehicles (e.g., minivan, sport utility vehicle, light truck, and/or the like) when boxed for retail sale. For example, an exemplary riding lawn mower configured in accordance with principles of the present disclosure is configured with a dry, unboxed weight of about 87 kilograms and a wheelbase of about 112 centimeters. Yet other riding lawn mowers configured in accordance with principles of the present disclosure are configured to be manufacturable at a reduced expense as compared to certain prior riding lawn mowers.

In various exemplary embodiments, a riding lawn mower is configured with a friction drive. As used herein, a "friction drive" generally refers to a powertrain where power is transferred from the engine to at least one other operational component of the powertrain via frictional engagement of two parts (for example, a flywheel and a friction wheel perpendicular to one another), rather than solely via a conventional drive shaft and gearset.

In various exemplary embodiments, with reference to FIG. 1A, riding lawn mower 100 comprises a steerable powered vehicle configured with various components for mowing a lawn. For example, riding lawn mower 100 comprises frame 110 coupled to a cutting deck 184 having at least one corresponding cutting blade. Moreover, riding lawn mower 100 may be configured with any suitable components configured to allow an operator to mow grass, for example a deflector 180, a footrest 182, a seat 186, and/or the like.

Figure 1B:
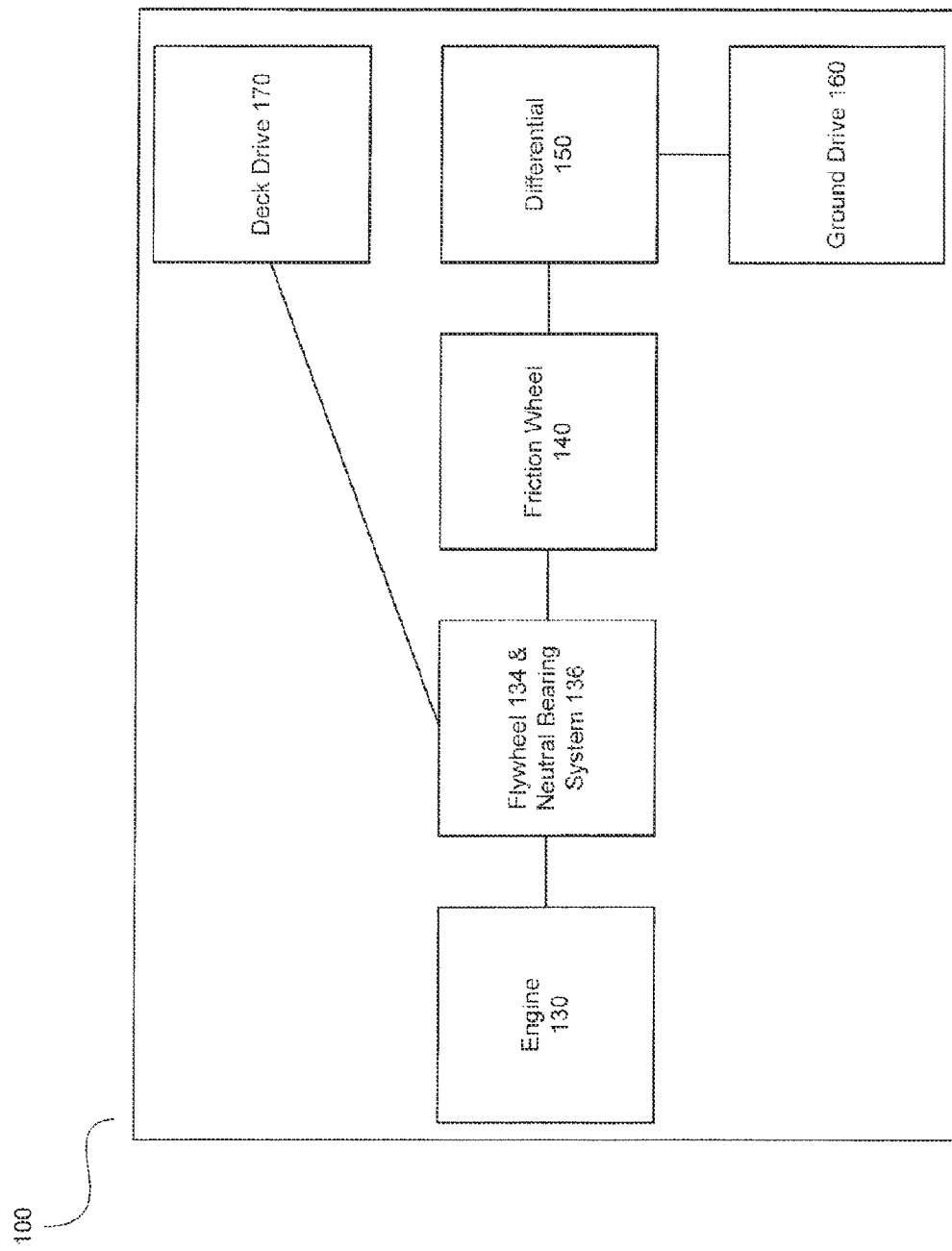
FIG. 1B illustrates a block diagram of components of an exemplary riding lawn mower in accordance with an exemplary embodiment.

With reference now to FIG. 1B, in various exemplary embodiments, riding lawn mower 100 further comprises engine 130 coupled to friction wheel 140. Engine 130 is coupled to friction wheel 140 via a flywheel 134 and neutral bearing system 136. Friction wheel 140 is coupled to differential 150, for example, via one or more of driveshafts, pinions, chains, and/or the like, in order to transfer power to differential 150. Differential 150 transfers operational power to ground drive 160 Flywheel 134 is also coupled to deck drive 170 via, for example, one or more of belts, pulleys, driveshafts, pinions, chains, and/or the like.

In various exemplary embodiments, engine 130 comprises an internal combustion engine, for example an internal combustion engine fueled by gasoline, diesel fuel, ethanol, and/or any other suitable fuel. Engine 130 may be configured with a displacement from about 175 cc to about 224 cc. Engine 130 may comprise an engine typically utilized for a walk-behind lawn mower. In one exemplary embodiment, engine 130 comprises a Briggs and Stratton model W14 engine having a displacement of about 190 cc. Moreover, engine 130 may comprise any engine configured to provide sufficient power to enable suitable operation of riding lawn mower 100 (e.g., partial or full operation of the ground drive and partial or full operation of the deck drive while supporting the weight of an operator).

In various exemplary embodiments, with momentary reference to FIG. 1C, engine 130 may be configured with respect to the other components of riding lawn mower 100 so as to achieve a desired configuration of the center of gravity of engine 130. For example, engine 130 may be coupled to riding lawn mower 100 such that the center of gravity of engine 130 is located "ahead" (e.g., closer to the front of riding lawn mower 100) of the rear axle of riding lawn mower 100. Moreover, engine 130 may also be coupled to riding lawn mower 100 such that the center of gravity of engine 130 is located "behind" (e.g., closer to the rear of riding lawn mower 100) the front axle of riding lawn mower 100 and/or the center of gravity of riding lawn mower 100. In this manner, engine 130 may be located so as to reduce and/or minimize mechanical components coupling engine 130 to ground drive 160 and/or deck drive 170, for example by eliminating a belt coupling engine 130 to ground drive 160.

With reference now to FIGS. 1A and 2, in various exemplary embodiments, riding lawn mower 100 is configured with a frame 110 (e.g., frame 210). In an exemplary embodiment, frame 210 is configured with a pair of tubular structures (a "dual-tubular" frame). Frame 210 is configured to provide structural support to riding lawn mower 100. Frame 210 may comprise one or more of steel, aluminum, titanium, iron, and/or other suitable metals and/or alloys thereof. In an exemplary embodiment, frame 210 comprises HSLA 50 A-10 1102 hot rolled steel tubing having an outer diameter of between about 3.0 centimeters to about 3.5 centimeters. Moreover, frame 210 may further comprise various plates, brackets, flanges, fasteners, and/or the like, as suitable, in order to couple to and/or support other components of riding lawn mower 100.

In an exemplary embodiment, frame 210 is configured with a dual-tubular design in order to provide flexion within frame 210, responsive to riding lawn mower 100 passing over uneven ground. The spacing between tubes comprising frame 210 may be suitably varied, as desired, in order to obtain a desired rigidity and/or other mechanical characteristics of frame 210.

In various exemplary embodiments, frame 210 is configured with one or more curved portions 210A. In this manner, frame 210 may be configured to at least partially "flex" or bend in a suitable direction (e.g., in a vertical direction), responsive to an applied force. By varying the bend radius of curved portions 210A, the dimensions of frame 210 (e.g., the outer diameter, the inner diameter, the wall thickness, etc.), placement of various coupling brackets 212, and the like, frame 210 may be configured to flex in a desired manner. For example, frame 210 is configured to flex in a manner such that riding lawn mower 100 responds to an applied force as if riding lawn mower 100 were configured with a conventional shock absorber system (e.g., springs, struts, linkages, and/or the like). In this exemplary embodiment, frame 210 is configured to provide the equivalent of about 2 centimeters (2 cm) of suspension travel. In other exemplary embodiments, frame 210 is configured to provide the equivalent of between about 1 cm and about 10 cm of suspension travel. In this manner, riding lawn mower 100 may be configured with an improved level of comfort for an operator, for example by reducing shock transferred to the rider. Moreover, by providing a suspension-like function, frame 210 may reduce wear on and/or damage to other components of riding lawn mower 100.

Frame 210 may be monolithic. Alternatively, frame 210 may comprise multiple components coupled together. Moreover, frame 210 may be cast, pressed, sintered, die-cut, machined, stamped, bonded, laminated, polished, smoothed, bent, rolled, molded, plated, coated, and/or otherwise shaped and/or formed via any suitable method and/or apparatus.

Figure 3A:
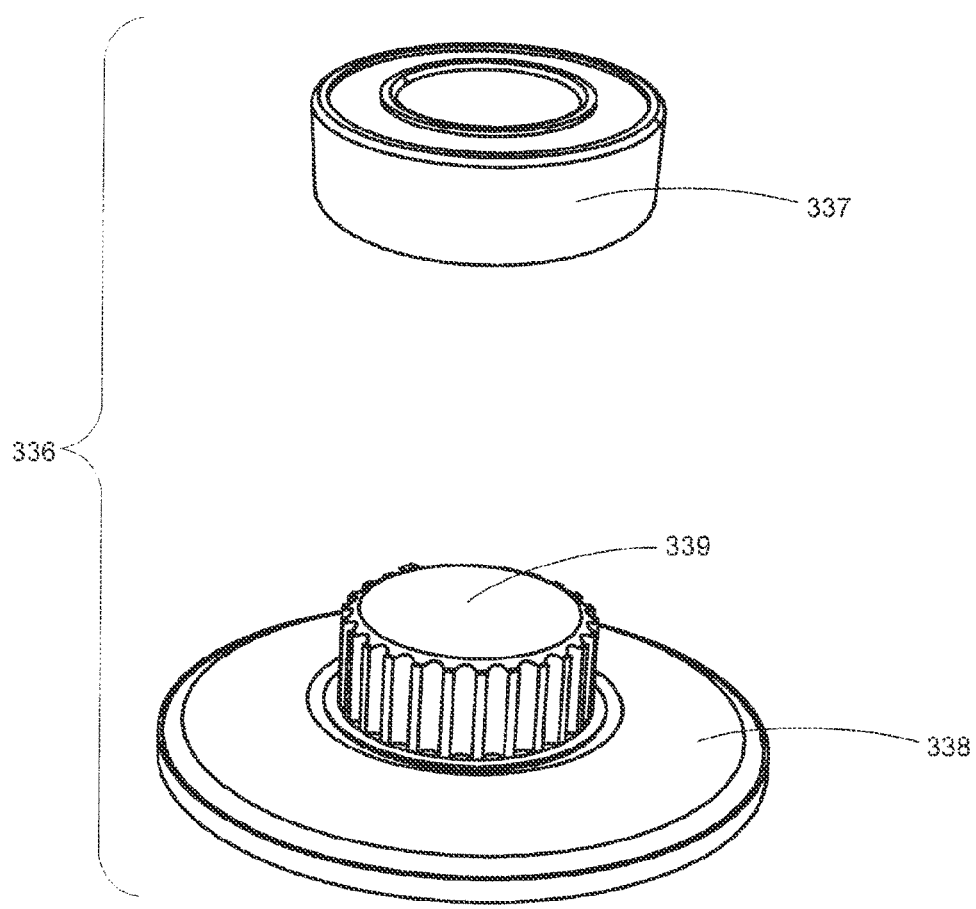
FIG. 3A illustrates a neutral bearing system for a friction drive in accordance with an exemplary embodiment.

In various exemplary embodiments, with reference now to FIGS. 1B and 3A, engine 130 is mounted to frame 210. Engine 130 is coupled to friction wheel 140 via a flywheel 134 configured with a neutral bearing system 136 (e.g., neutral bearing system 336). In an exemplary embodiment, neutral bearing system 336 comprises a bearing 337 and a cover plate 338. Cover plate 338 may be configured with a flange 339 extending at least partially into bearing 337 in order to couple thereto.

In an exemplary embodiment, flywheel 134 is coupled to engine 130 (for example, coupled to the crankshaft of engine 130) via a fastener disposed through a cavity generally located in the center of flywheel 134. Bearing 337 may be disposed in the cavity. In an exemplary embodiment, an outer surface of bearing 337 is coupled to flywheel 134 (e.g., via frictional engagement). An inner surface of bearing 337 is coupled to cover plate 338 (e.g., via frictional engagement). In this manner, flywheel 134 may be coupled to engine 130 in order to facilitate operation of the friction drive, while maintaining a suitably continuous surface across which friction wheel 340 may traverse during operation of the friction drive.

In an exemplary embodiment, bearing 337 comprises a needle bearing. In another exemplary embodiment, bearing 337 comprises a roller bearing. In yet other exemplary embodiments, bearing 337 comprises a ball bearing. Moreover, bearing 337 may comprise any suitable components and/or mechanisms configured to allow cover plate 338 to remain fixed with respect to friction wheel 340 when cover plate 340 is engaged by friction ring 341, while flywheel 134 is permitted to rotate.

In various exemplary embodiments, flywheel 134 comprises steel. In other exemplary embodiments, flywheel 134 comprises powdered metal. In these embodiments, flywheel 134 may be infused with copper or other suitable material in order to provide desirable frictional and/or structural characteristics of flywheel 134. In an exemplary embodiment, flywheel 134 comprises a material having a hardness exceeding that of aluminum, for example a hardness in excess of 60 HRb on the Rockwell B scale. Moreover, flywheel 134 may comprise any suitable material configured to frictionally engage with friction wheel 340 in order to transfer force to other components of riding lawn mower 100. Flywheel 134 may be configured to be suitable for use over a variety of operating RPM ranges of engine 130, for example from about 0 RPM up to about 4000 RPM.

Figure 3B:
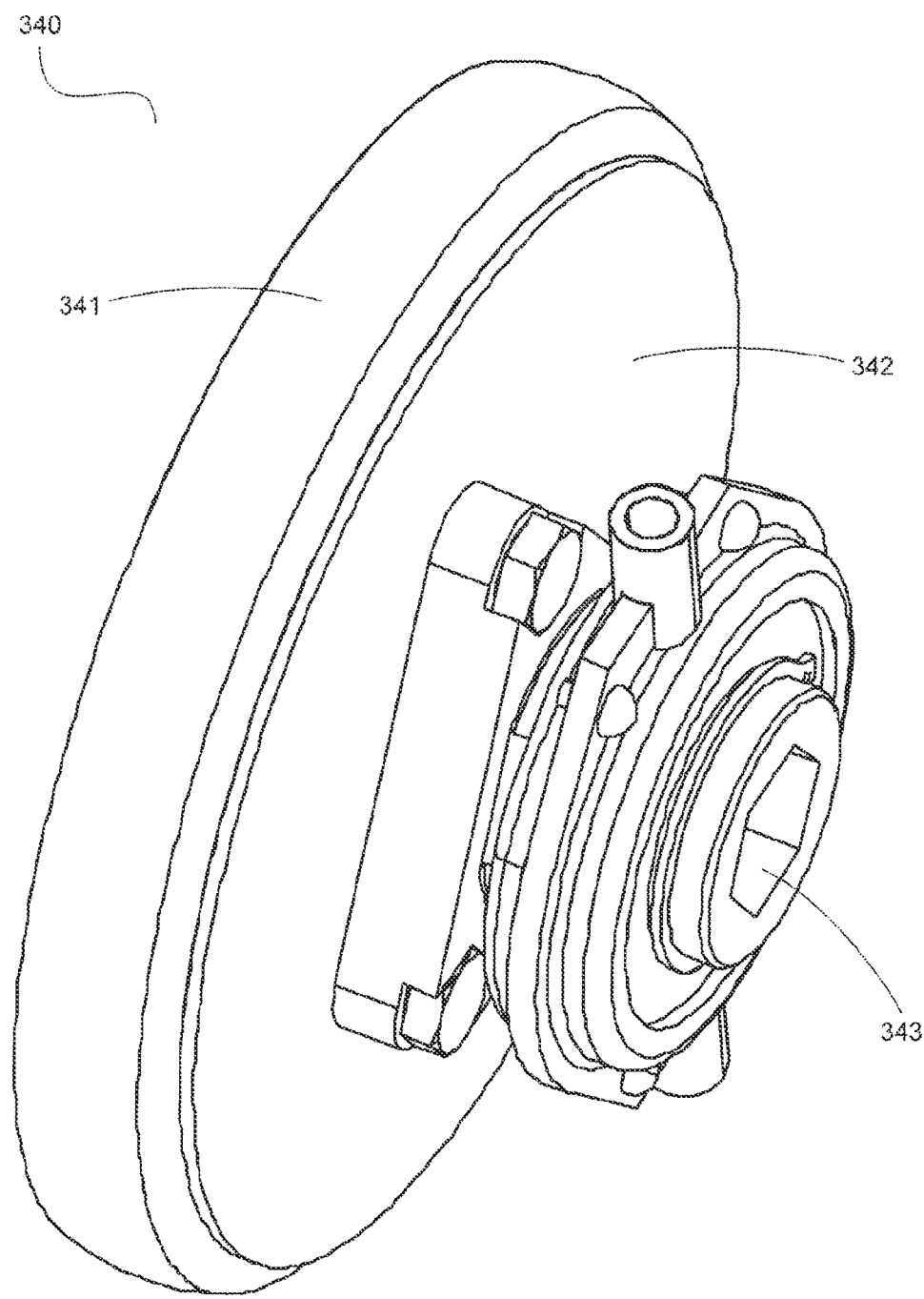
FIG. 3B illustrates a friction wheel for a friction drive accordance with an exemplary embodiment.
Figure 4:
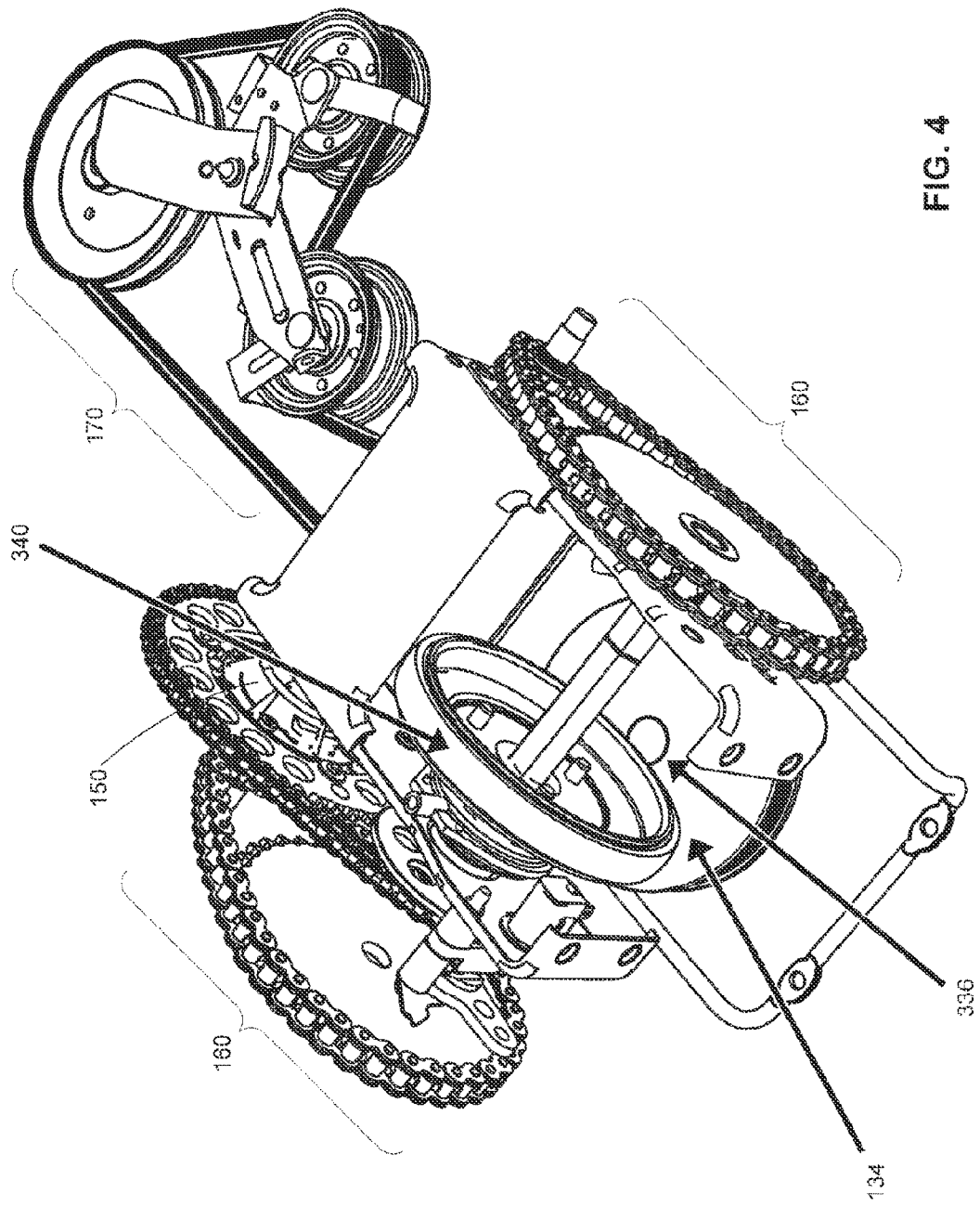
FIG. 4 illustrates a drivetrain for a riding lawn mower including a friction drive in accordance with an exemplary embodiment.

In various exemplary embodiments, with reference now to FIGS. 3B and 4, friction wheel 140 (e.g., friction wheel 340) is configured to frictionally engage with flywheel 134. Friction wheel 340 comprises friction ring 341 coupled to wheel body 342. Wheel body 342 is configured to provide structural support to friction wheel 340. Moreover, wheel body 342 is configured to couple to other power transfer components (e.g., a driveshaft), in order to transfer force received via friction ring 341. In an exemplary embodiment, wheel body 342 couples to a driveshaft via a suitably shaped cavity 343 in order to transfer rotational force.

Friction ring 341 may comprise any suitable material configured to frictionally engage flywheel 134. In an exemplary embodiment, friction ring 341 comprises rubber. In another exemplary embodiment, friction ring 341 comprises a composite. Friction ring 341 may be removed from wheel body 342 and replaced with a new ring, as suitable, for example responsive to wear.

In various exemplary embodiments, riding lawn mower 100 is configured to reduce flat spotting on friction ring 341. As used herein, "flat spotting" generally refers to wearing of a non-round area on friction ring 341 caused by flywheel 134 continuing to rotate when friction wheel 340 is frictionally coupled to flywheel 134 close to or at the center of flywheel 134. In this position ("neutral"), friction wheel 340 does not transfer rotary motion from flywheel 134, but simply suffers frictional wear at the exterior (e.g., on friction ring 341). The resulting wear and consequent "out of roundness" of friction ring 341 reduces the effectiveness of later frictional engagement between friction wheel 340 and flywheel 134. For example, as the flat spot on friction ring 341 passes over flywheel 134, slippage can occur, leading to undesirable lagging, surging, and/or otherwise uneven power delivery.

In order to reduce flat spotting, various prior approaches for friction drives have disengaged a friction wheel and a flywheel in the neutral position and/or positions close thereto. In contrast, in various exemplary embodiments, flywheel 134 and friction ring 341 remain in frictional engagement in the neutral position. Flat spotting of friction ring 341 is prevented because, at the neutral position, friction ring 341 is in contact with cover plate 338 which is rotatably supported by bearing 337. Thus, cover plate 338 remains fixed with respect to friction ring 341, while flywheel 134 continues to rotate, eliminating flat spotting of friction ring 341. Instead of rotational wear on friction ring 341, rotational movement of bearing 337 occurs. In this manner, prolonged life of friction ring 341 may be achieved. Moreover, riding lawn mower 100 may thus be configured with smoother, more reliable power transfer between engine 130 and other components of riding lawn mower 100.

In an exemplary embodiment, when friction wheel 340 is displaced across flywheel 134 in a first direction out from the center of flywheel 134, riding lawn mower 100 is operative in a "forward" direction. Conversely, when friction wheel 340 is displaced across flywheel 134 in a second direction (opposite the first direction) out from the center of flywheel 134, riding lawn mower 100 is operative in a "reverse" direction. In various exemplary embodiments, the mechanical components configured to displace friction wheel 340 in the reverse direction simultaneously operate a "reverse" direction indicator, for example via a lever arm closing an electrical contact. In this manner, an operator may be notified of "reverse" operation each time riding lawn mower 100 enters operation in the reverse direction.

Figure 5A:
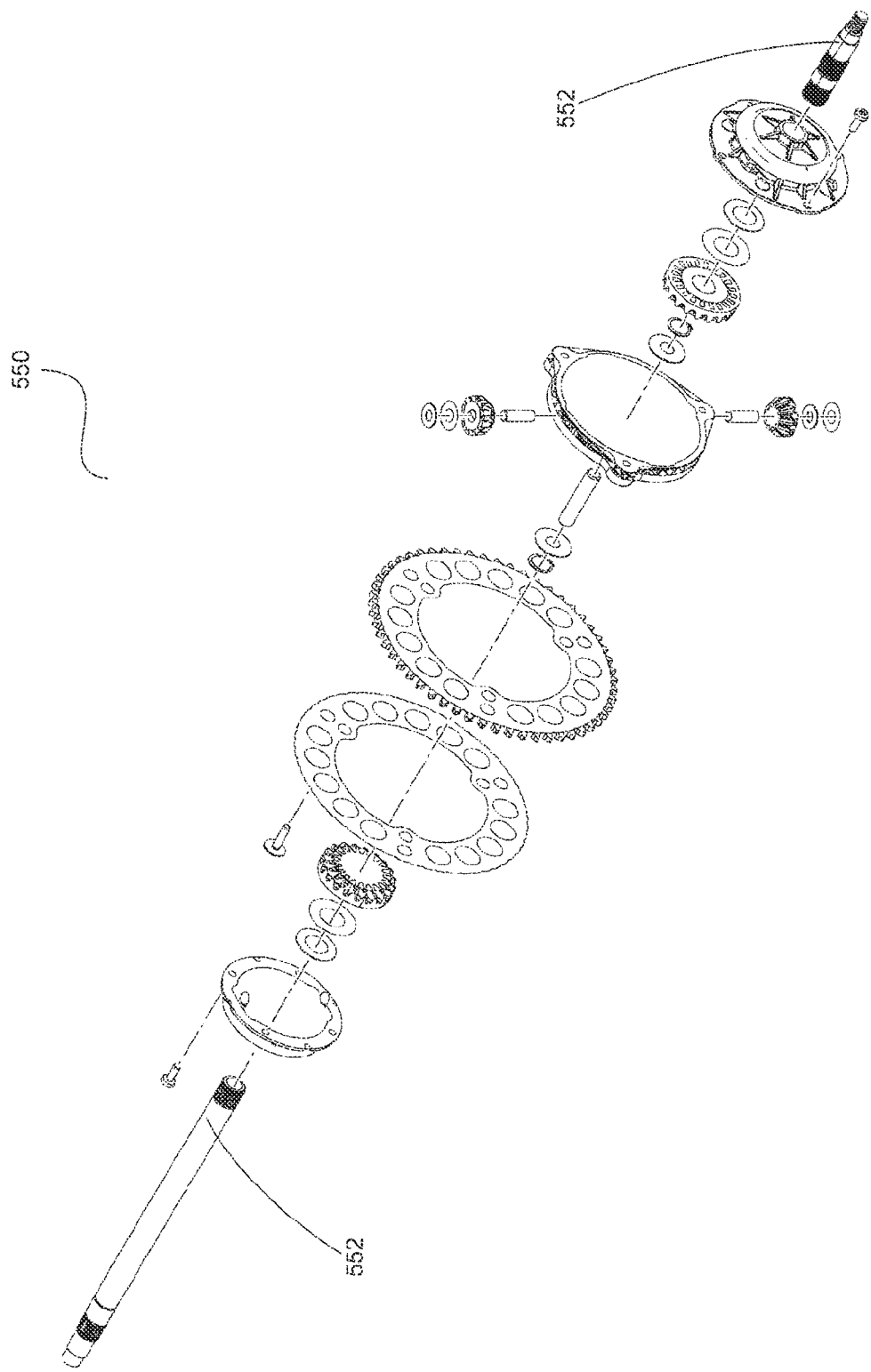
FIG. 5A illustrates an exploded view of a differential for a riding lawn mower in accordance with an exemplary embodiment.
Figure 5B:
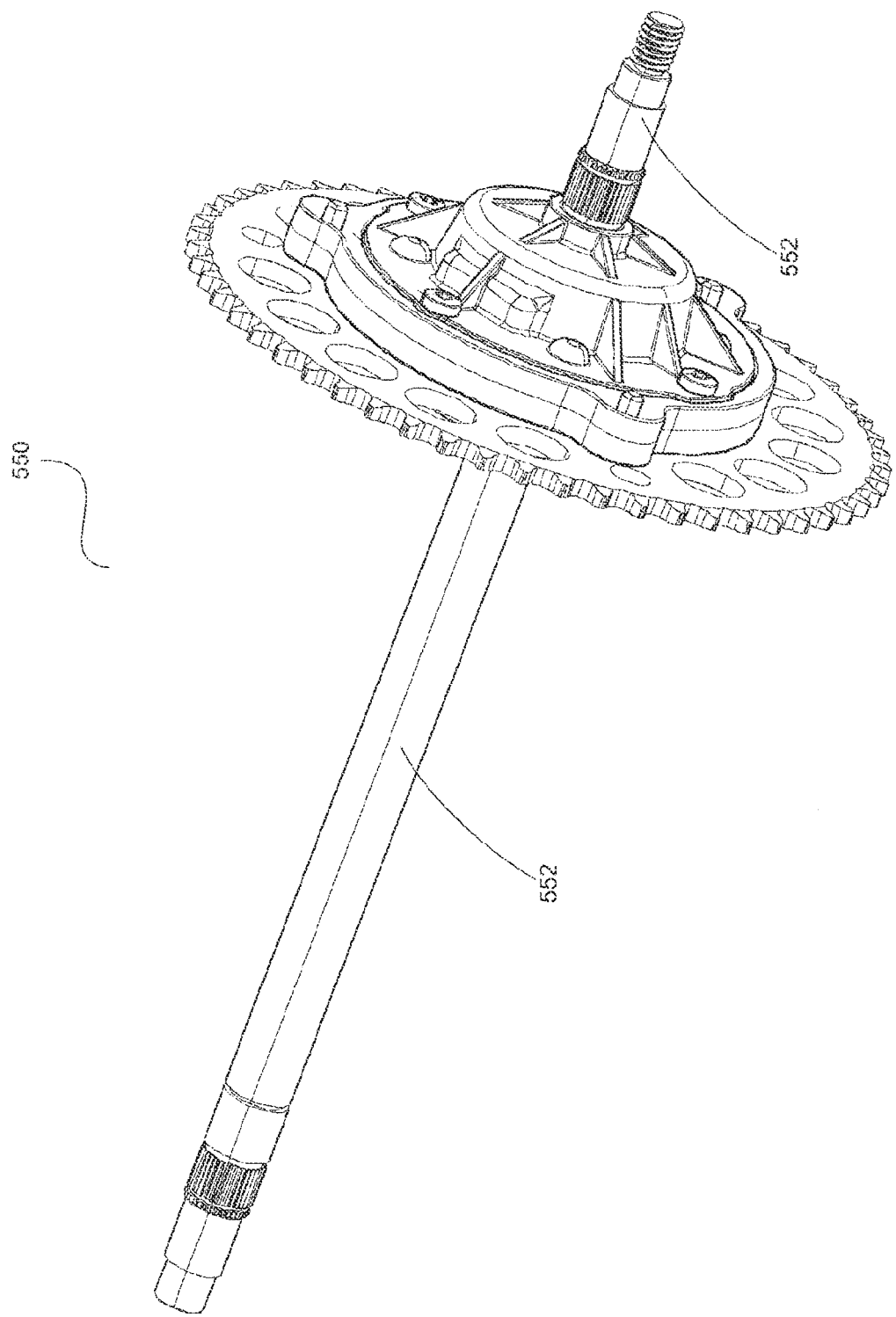
FIG. 5B illustrates an assembled view of a differential for a riding lawn mower in accordance with an exemplary embodiment.

Once power is transferred from engine 130 to friction wheel 340, it may then be delivered to other components of riding lawn mower 100, for example to a differential 150. With reference now to FIGS. 1B, 5A, and 5B, in an exemplary embodiment, a differential 150 (e.g., differential 550) comprises a plurality of gears (e.g., one or more of ring gears, planet gears, side gears, and/or the like). One or more gears comprising differential 550 may comprise plastic or other suitable structural material, for example in order to reduce one or more of noise, weight, cost, and/or the like.

In an exemplary embodiment, differential 550 comprises at least one differential shaft 552. Differential shaft 552 may comprise any suitable structural material configured to transfer torque, for example, steel, aluminum, titanium, iron, and/ or the like. In an exemplary embodiment, differential shaft 552 comprises elevated temperature drawing ("ETD") 150 steel. Differential shaft 552 may be monolithic. Differential shaft 552 may also comprise multiple portions. Moreover, portions of differential shaft 552 may coupled to one another in any suitable manner. In an exemplary embodiment, portions of differential shaft 552 are coupled to one another via a dowel pin. In this manner, the portions of differential shaft 552 may be aligned with respect to one another, as desired.

In an exemplary embodiment, differential 550 is coupled to the rear wheels of riding lawn mower 100, for example via a drive gear associated with each rear wheel. The drive gear for each rear wheel may comprise any suitable material and/or be configured with any suitable diameter and/or tooth pattern, as desired. In an exemplary embodiment, the drive gear for each rear wheel comprises plastic. In other exemplary embodiments, the drive gear for each rear wheel comprises glass-filled nylon, for example nylon filled with from about 20% to about 40% glass.

Figure 6A:
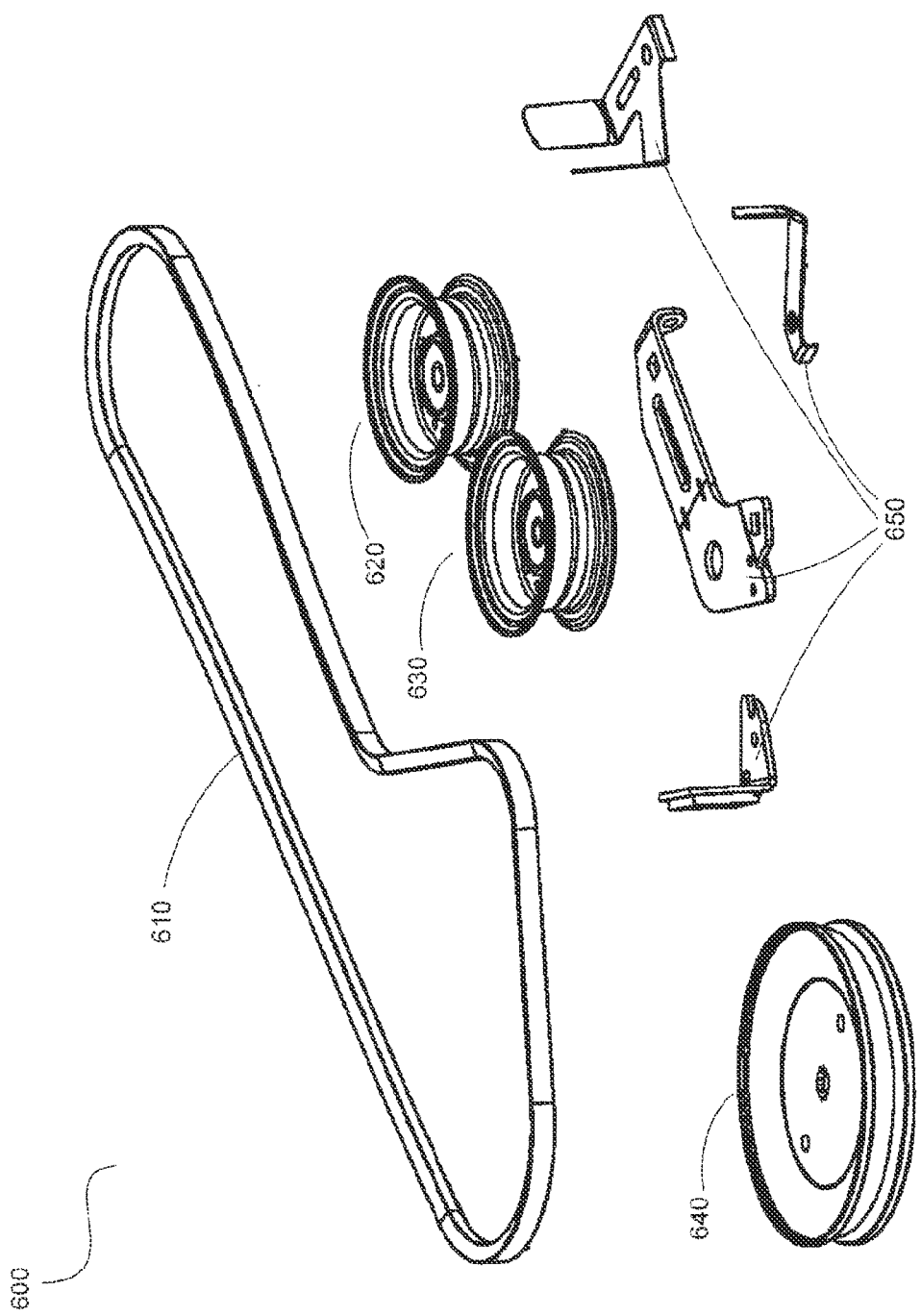
FIG. 6A illustrates an exploded view of a dual pulley and brake system for a deck drive of a riding lawn mower in accordance with an exemplary embodiment.
Figure 6B:
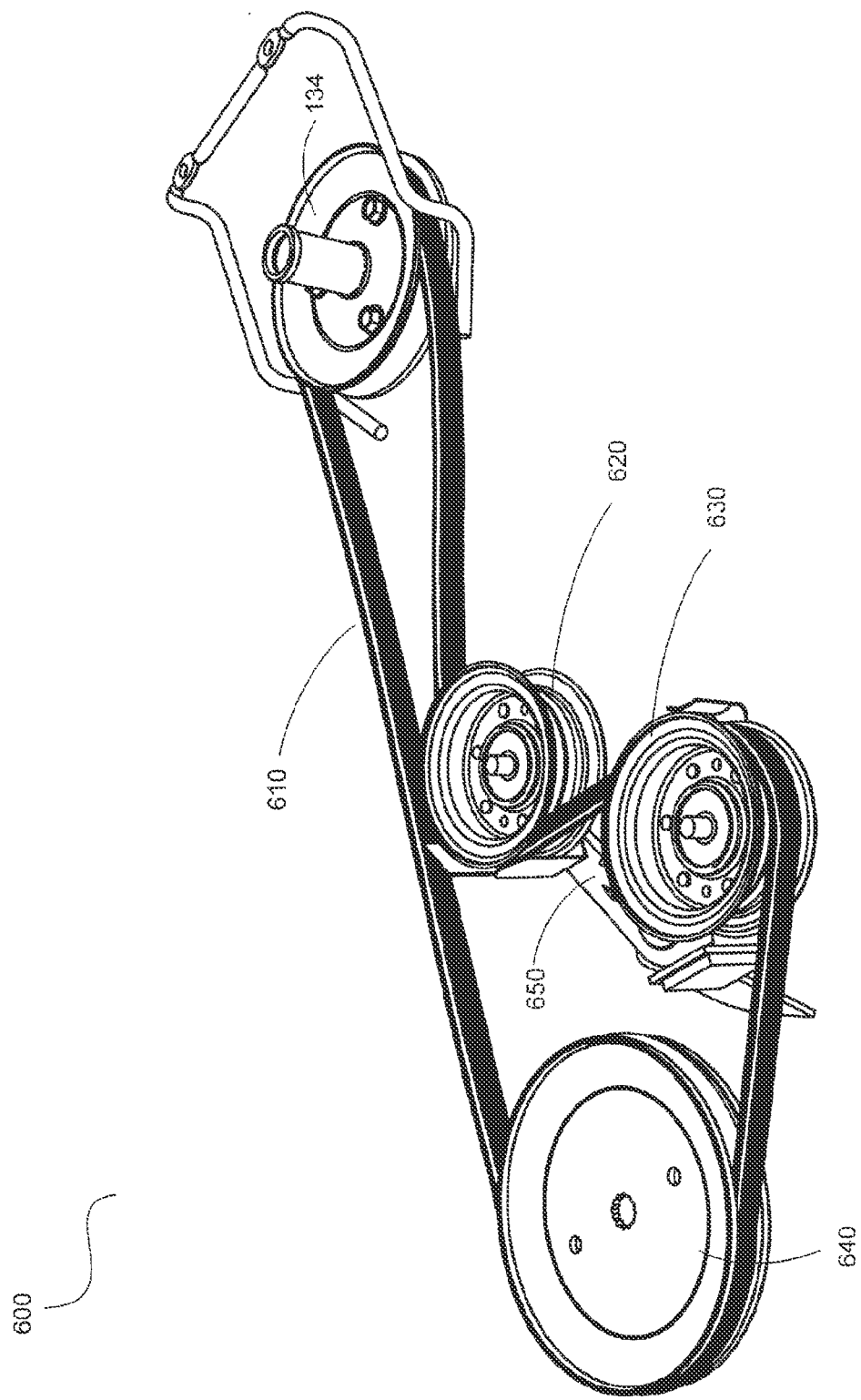
FIG. 6B illustrates an assembled view of a dual pulley and brake system for a deck drive of a riding lawn mower in accordance with an exemplary embodiment.

Turning now to FIGS. 1B, 6A and 6B, in various exemplary embodiments, riding lawn mower 100 is configured as a "single belt" system. Stated another way, riding lawn mower 100 is configured with one belt coupling engine 130 to deck drive 170, but no other belts. In various prior riding lawn mowers and/or lawn tractors, a "dual belt" system is utilized, where one belt couples the engine and the deck drive, and another belt couples the engine and the ground drive. In contrast, a single-belt system in accordance with principles of the present disclosure allows for reduced complexity and reduced manufacturing expense.

In various exemplary embodiments, riding lawn mower 100 is configured as a "dual pulley" system. Stated another way, riding lawn mower 100 is configured with two pulleys for adjusting tension on a belt coupling engine 130 and deck drive 170. In various prior riding lawn mowers and/or lawn tractors, a "single pulley" system is utilized. In contrast, a dual-pulley system in accordance with principles of the present disclosure allows for greater geometric advantage when varying the tension on an associated belt.

In an exemplary embodiment, a deck drive 170 (e.g., deck drive 600) comprises a belt 610 routed about pulleys 610 and 620. Pulleys 610 and/or 620 may be spring-loaded or otherwise configured to impart a desired tension to belt 610, for example responsive to operation of a clutch. Belt 610 transfers force to deck pulley 640 which is coupled to a cutting blade configured to cut grass. As the clutch is engaged, pulleys 620 and 630 move, taking up slack in belt 610 and thus gradually engaging belt 610 against pulleys 620, 630, and 640 in order to turn a cutting blade coupled to pulley 640. As the clutch is released, pulleys 620 and 630 move in an opposite direction, reducing tension in belt 610 and thus at least partially disengaging belt 610 from pulleys 620, 630, and 640. Thus, force is no longer delivered to the cutting blade, and the cutting blade eventually ceases rotation.

In various exemplary embodiments, pulleys 620 and 630 are configured with an extended height in order to allow for greater vertical displacement of pulley 640 and/or other components of deck drive 600. In an exemplary embodiment, pulleys 620 and 630 are configured with a height at least twice the height of belt 610, providing additional room for belt 610 to move with respect to pulleys 620 and 630. In this manner, deck drive 600 can accommodate increased vertical displacement as compared to deck drives lacking pulleys with extended heights.

In order to reduce the likelihood of injury, it is desirable for a cutting blade to more rapidly come to a stop when a clutch is disengaged. Thus, in various exemplary embodiments, riding lawn mower 100 is configured with a linked clutch and brake system. Continuing with reference to FIGS. 6A and 6B, one or more structural components 650 (e.g., brackets, linkages, couplers, and/or the like) are coupled to pulleys 620 and/or 630. Structural components 650 may further be coupled to various braking components (e.g., components configured to impart a drag force to a cutting blade, a wheel, a pulley, and/or the like, such as a brake caliper, a brake disk, etc). In this manner, in these exemplary embodiments, disengagement of the clutch simultaneously activates braking components, bringing the cutting blade to a stop more rapidly.

Figure 7:
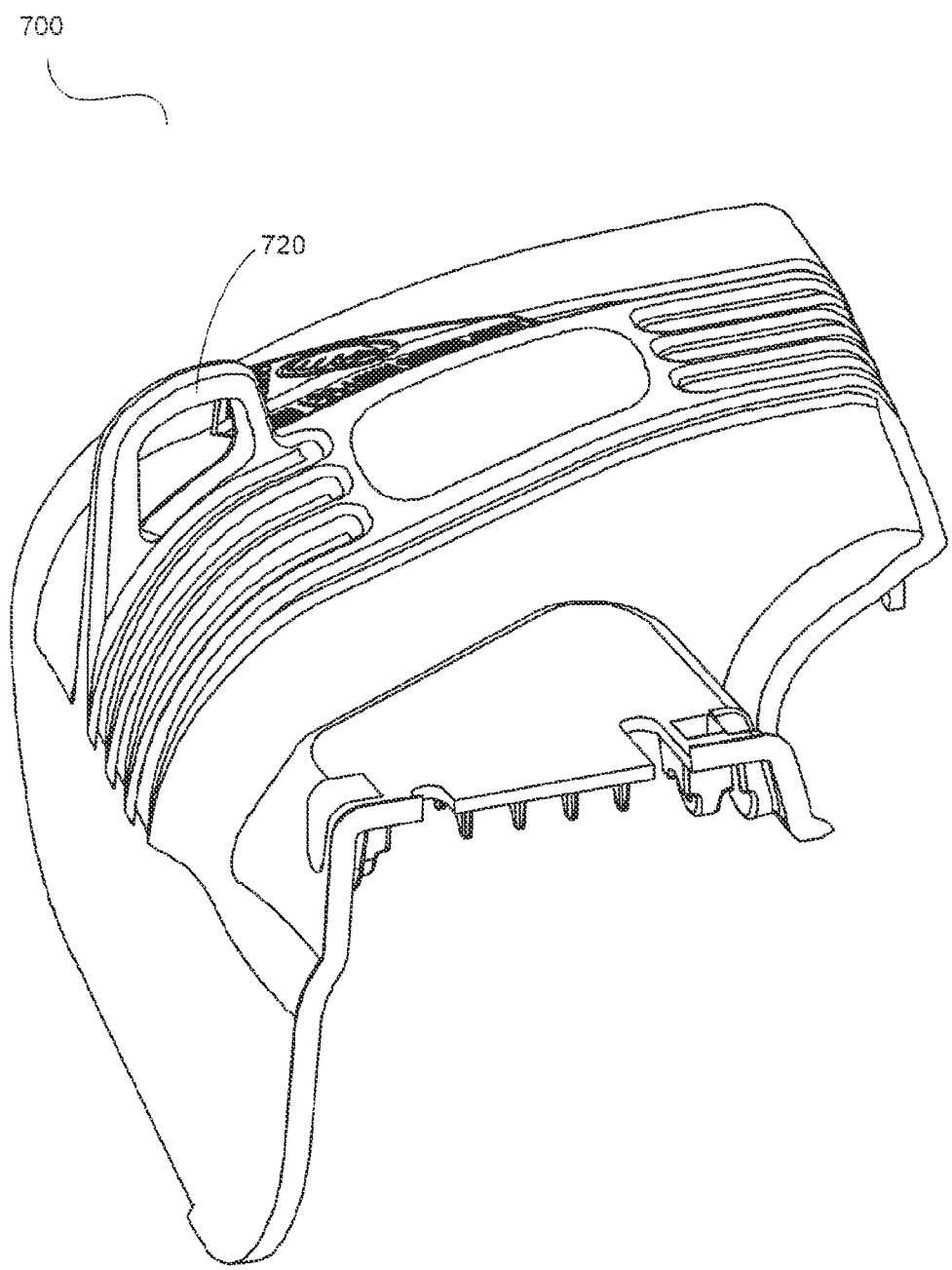
FIG. 7 illustrates a deflector for a riding lawn mower in accordance with an exemplary embodiment.

With reference now to FIG. 7, in various exemplary embodiments, riding lawn mower 100 is configured with a deflector 700. Deflector 700 is configured to at least partially guide, contain, and/or control material ejected from the cutting deck of riding lawn mower 100. For example, deflector 700 may be configured with various suitable angles, lengths, curvatures, and/or the like, in order to achieve a desired pattern of grass clippings ejected from the cutting deck.

In an exemplary embodiment, deflector 700 is configured with a loop 720 configured to allow an operator to grasp it. In this manner, deflector 700 may be moved, raised, lowered, and/or otherwise adjusted, for example in order to vary the path of debris ejected from the cutting deck or to remove an obstruction, without an operator (or with minimal) needing to reach underneath deflector 700 to grasp it. In this manner, deflector loop 720 allows an operator to move deflector 700 without exposing the operator to the debris path beneath deflector 700.

In an exemplary embodiment, deflector loop 720 is a loop. In other exemplary embodiments, deflector loop 720 may comprise a flange, a knob, a rod, a handle, and/or the like, or other suitable component configured to allow an operator to move deflector 700 without exposure to a debris path.

Figure 8:
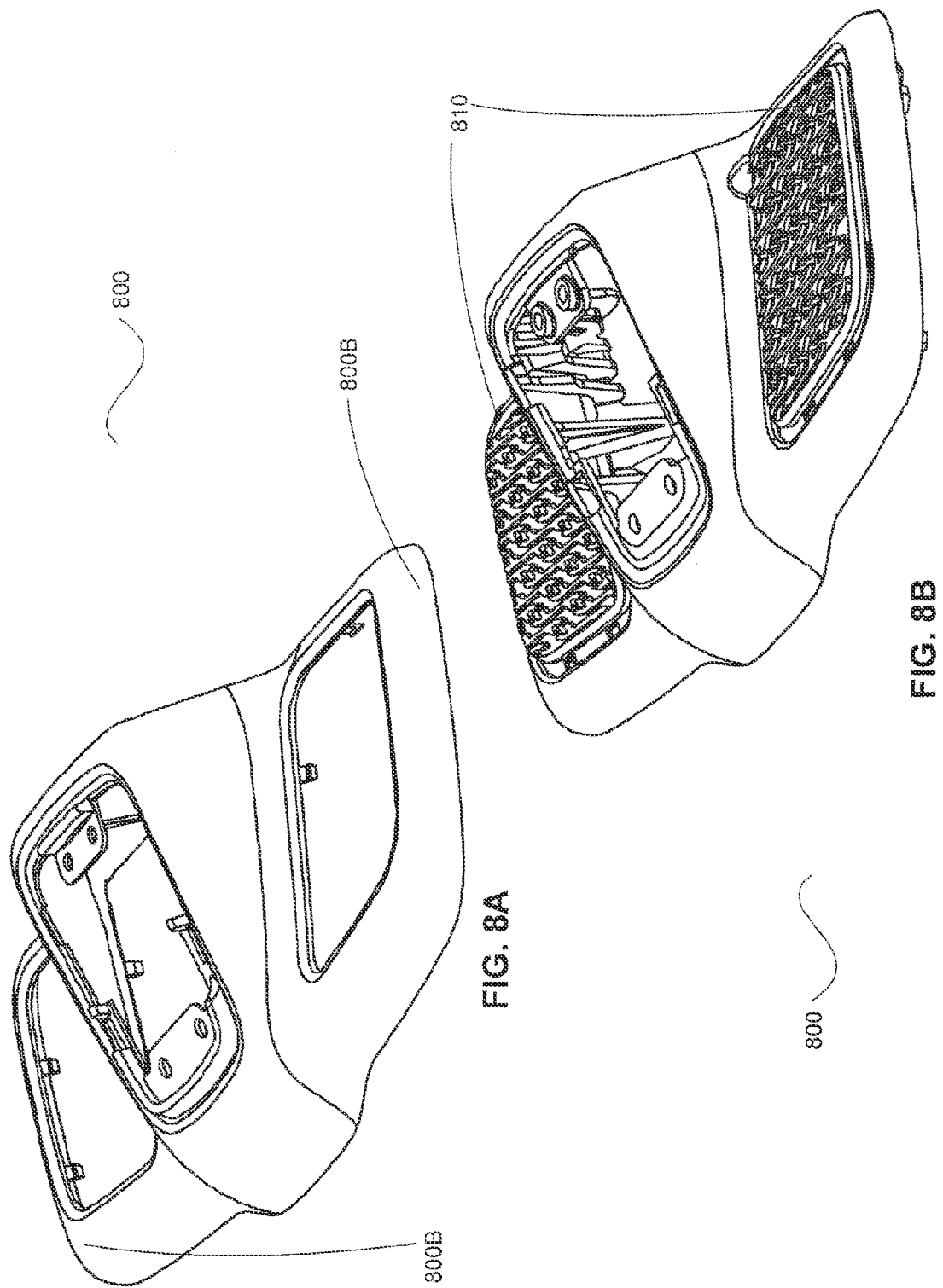
FIGS. 8A and 8B illustrate a foot rest for a riding lawn mower in accordance with an exemplary embodiment.

Turning now to FIGS. 8A-8B, in various exemplary embodiments, riding lawn mower 100 is configured with a footrest 800. Footrest 800 is coupled to frame 210. Footrest 800 may comprise any suitable structural material, for example plastic, metal, composite, and/or the like. In an exemplary embodiment, footrest 800 comprises glass-filled polypropylene in an amount from about 15% glass to about 40% glass. In various exemplary embodiments, footrest 800 is configured with edges 800A and 800B cantilevered away from frame 210. Edges 800A and 800B may be cantilevered any suitable distance (e.g., about 15 centimeters), while still remaining strong enough to support the weight of an operator of riding lawn mower 100, for example an operator weighing about 100 kilograms. In various exemplary embodiments, footrest 800 is configured with inserts 810. Inserts 810 may provide cushioning and/or grip for the feet of an operator, as desired.

Figure 9:
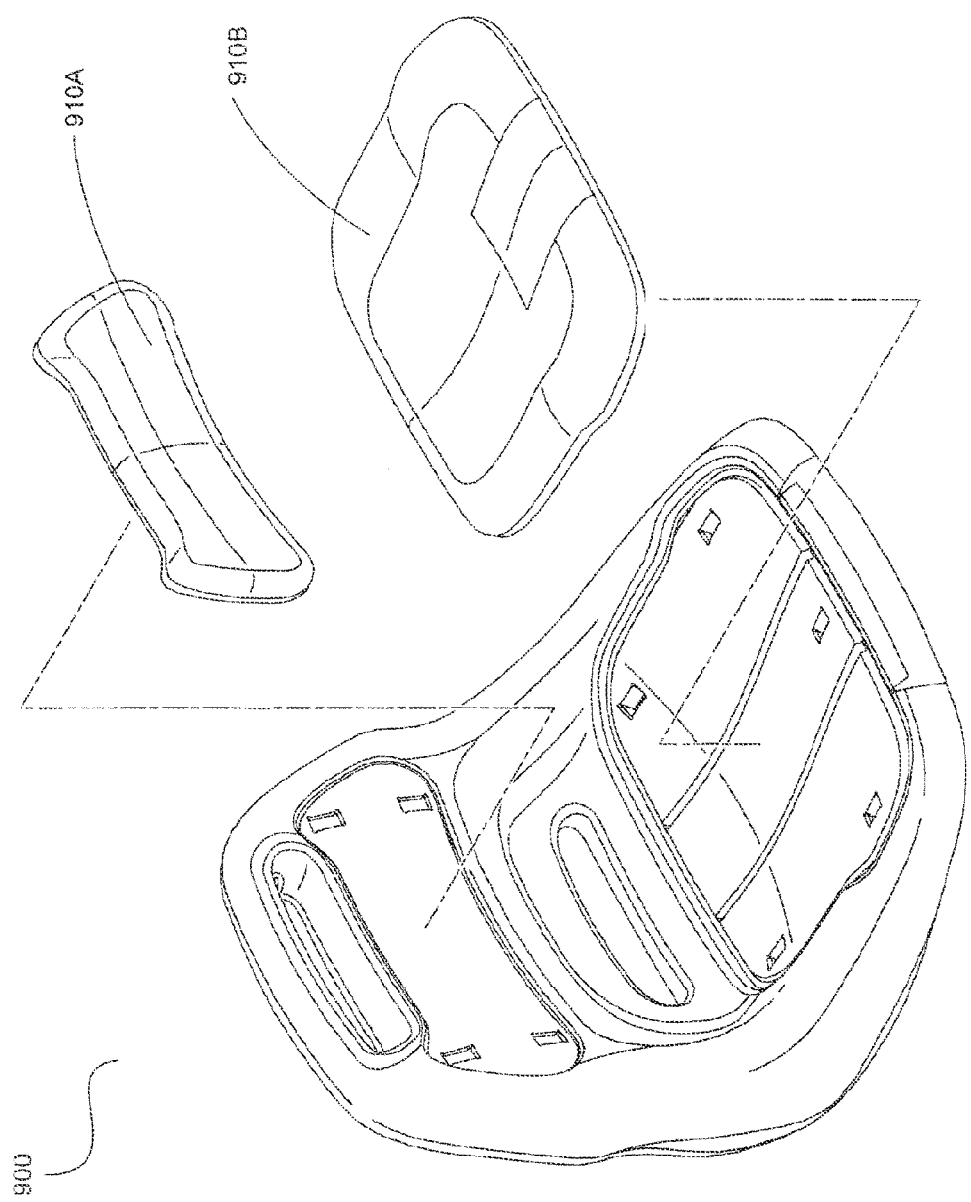
FIG. 9 illustrates a seat for a riding lawn mower in accordance with an exemplary embodiment.

With reference now to FIG. 9, in various exemplary embodiments, riding lawn mower 100 is configured with a seat 900. Scat 900 is configured to accommodate an operator. In an exemplary embodiment, seat 900 comprises calcium filled polypropylene, for example from about 20% to about 30% calcium. In another exemplary embodiment, seat 900 comprises VistaMaxx™ brand polypropylene based elastomers manufactured by ExxonMobil Chemical.

In various exemplary embodiments, seat 900 is configured with a gas chamber about the exterior of seat 900. In this manner, seat 900 may be configured with suitable structural characteristics and/or manufacturing characteristics, for example ease of molding. Moreover, seat 900 may be configured with various padding components, for example snap-in padding components 910A and 910B. Scat 900 may be coupled to frame 210 and/or other portions of riding lawn mower 100, as suitable.

In an exemplary embodiment, riding lawn mower 100 is configured with a foot-operated bypass. Stated generally, a "bypass" refers to components configured to disengage a ground drive without disengaging a deck drive, allowing riding lawn mower 100 to operate a deck drive while remaining stationary and/or moving only under the influence of gravity (for example, down a hill). In various prior lawn mowers, operation of the bypass required use of a hand, for example grasping the end of a lever and pulling. In contrast, riding lawn mower 100 is configured with a foot-operated bypass (for example, a bypass operated via a downward force applied by a foot), eliminating the need to bend over to operate the bypass. In an exemplary embodiment, operation of the foot-operated bypass of riding lawn mower 100 results in physical disengagement of flywheel 134 from friction wheel 140, preventing transfer of power to differential 150 and thus preventing powered operation of ground drive 160.

In an exemplary embodiment, riding lawn mower 100 is configured with a constant load clutch. Many previous riding lawn mowers have been configured with an "over center" clutch which rapidly engages the engine to components of the drivetrain. In contrast, in various exemplary embodiments, riding lawn mower 100 utilizes a constant load clutch wherein engine 130 and deck drive 170 are gradually engaged over a range of angular motion of a clutch lever arm. In various exemplary embodiments, the constant load clutch engages over a range of angular motion of the clutch lever arm from about 15 degrees to about 40 degrees. In an exemplary embodiment, the constant load clutch engages over a range of angular motion of the clutch lever arm of about 25 degrees. In this manner, load is placed on engine 130 in a gradual fashion, reducing the likelihood of engine 130 stalling. Thus, a smaller, less powerful, and/or less expensive engine 130 may be utilized in riding lawn mower 100 as compared to prior riding lawn mowers.

In various exemplary embodiments, with momentary reference again to FIG. 1A, riding lawn mower 100 is configured with a self-centering cutting deck 184. As used herein, "self-centering" generally refers to a cutting deck configured to return to a centered position with respect to the sides of lawn mower 100 after being displaced. For example, when an operator steps on cutting deck 184, cutting deck 184 and/or components coupling cutting deck 184 to frame 210 are configured to flex, bend, slide, and/or otherwise move responsive to the applied force. Thus, cutting deck 184 may move sideways a certain distance. Once the applied force is removed, for example when an operator removes a foot, cutting deck 184 returns to a centered position. Self-centering may be achieved, for example, via suspending cutting deck 184 from frame 210 in a suitable manner, for example by utilizing angled metal bars having similar dimensions. Responsive to displacement of cutting deck 184, the bars generate a force tending to move cutting deck 184 back to a centered position. Springs and other mechanical approaches may also be utilized, as suitable.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A riding lawn mower comprising:
a cutting deck housing a cutting blade;
an engine;
a deck drive coupled to the engine to receive power for operating the cutting blade;
a ground drive coupled to the engine to receive power for movement of the riding lawn mower over ground; and
a friction drive comprising a flywheel and a friction wheel, wherein the flywheel couples the deck drive to the engine,
wherein the flywheel comprises a neutral bearing system,
wherein the flywheel is coupled to the ground drive via the friction wheel,
wherein the flywheel comprises a substantially disc shaped face disposed to engage at least a portion of the friction wheel to impart motion on the friction wheel responsive to rotation of the flywheel when the flywheel contacts the friction wheel, and
wherein the neutral bearing system is disposed proximate to an axis of rotation of the flywheel to prevent frictional engagement of the flywheel and the friction wheel at a portion of the flywheel that is covered by a cover plate of the neutral bearing system.

2. The riding lawn mower of claim 1, wherein the axis of rotation of the flywheel is substantially perpendicular to an axis of rotation of the friction wheel.

3. The riding lawn mower of claim 1, wherein an axis of rotation of the friction wheel is substantially parallel to a plane in which the disc shaped face lies, and wherein the friction wheel transitions from transferring drive power for forward movement of the riding lawn mower to transferring drive power for reverse movement by moving linearly along the axis of rotation of the friction wheel from a location proximate to one side of the face to a location proximate to an opposite side of the face.

4. The riding lawn mower of claim 1, wherein the neutral bearing system comprises the cover plate and a bearing configured to enable the cover plate to remain stationary while the flywheel rotates.

5. The riding lawn mower of claim 4, wherein the bearing comprises a needle bearing, a roller bearing, or a ball bearing.

6. The riding lawn mower of claim 1, wherein the friction wheel and the flywheel form a portion of a drivetrain of the riding lawn mower in combination with a differential, wherein the differential comprises at least one plastic gear, wherein the differential is coupled to the friction wheel in order to transfer power to at least one drive wheel of the riding lawn mower.

7. The riding lawn mower of claim 6, wherein translation of the friction wheel into a reverse position with respect to the flywheel mechanically operates a reverse detection sensor.

8. The riding lawn mower of claim 1, wherein the flywheel comprises powdered metal.

9. The riding lawn mower of claim 1, wherein the flywheel is configured to provide power to the ground drive via engagement with the friction wheel, the flywheel engaging a portion of the friction wheel over at least two regions comprising:
 a first region where the engagement between the flywheel and the friction wheel causes movement of the riding lawn mower in a forward direction, and
 a second region where engagement between the flywheel and the friction wheel causes movement of the riding lawn mower in a reverse direction.

10. The riding lawn mower of claim 9, wherein the friction wheel engages the neutral bearing system at a third region of the flywheel.

11. The riding lawn mower of claim 10, wherein the third region is disposed centrally between the first region and the second region.

12. The riding lawn mower of claim 10, wherein the friction wheel engages the flywheel in the first region at a portion of the flywheel that is displaced from the axis of rotation of the flywheel in a first direction, and
 wherein the friction wheel engages the flywheel in the second region at a portion of the flywheel that is displaced from the axis of rotation of the flywheel in a second direction that is opposite of the first direction.

13. The riding lawn mower of claim 9, wherein an axis of rotation of the friction wheel is substantially parallel to a plane in which the disc shaped face lies, and
 wherein the friction wheel transitions from transferring drive power in the forward direction to transferring drive power in the reverse direction by moving linearly along the axis of rotation of the friction wheel from a location proximate to one side of the face to a location proximate to an opposite side of the face.

14. The riding lawn mower of claim 1, wherein the engine is configured to have a displacement of less than about 225 cubic centimeters.

15. The riding lawn mower of claim 1, wherein the riding lawn mower weighs less than about 87 kilograms.

16. The riding lawn mower of claim 1, wherein the riding lawn mower has a wheelbase of about 112 centimeters.

17. The riding lawn mower of claim 1, wherein the riding lawnmower weighs less than about 87 kilograms, wherein the engine is configured to have a displacement of less than about 225 cubic centimeters, and wherein the riding lawn mower has a wheelbase of about 112 centimeters.

18. The riding lawn mower of claim 1, wherein the engine is configured to have a displacement of less than about 190 cubic centimeters.

19. The riding lawn mower of claim 1, further comprising a frame configured to support the engine, wherein the frame comprises at least one curved portion configured to flex to provide an equivalent of about 2 centimeters of suspension travel.

20. A friction drive for a riding lawn mower comprising a cutting deck housing a cutting blade, an engine, a deck drive coupled to the engine to receive power for operating the cutting blade, and a ground drive coupled to the engine to receive power for movement of the riding lawn mower over ground, the friction drive comprising:
 a flywheel; and
 a friction wheel,
 wherein the flywheel couples the deck drive to the engine,
 wherein the flywheel comprises a neutral bearing system,
 wherein the flywheel is coupled to the ground drive via the friction wheel,
 wherein the flywheel comprises a substantially disc shaped face disposed to engage at least a portion of the friction wheel to impart motion on the friction wheel responsive to rotation of the flywheel when the flywheel contacts the friction wheel, and
 wherein the neutral bearing system is disposed proximate to an axis of rotation of the flywheel to prevent frictional engagement of the flywheel and the friction wheel at a portion of the flywheel that is covered by a cover plate of the neutral bearing system.

\* \* \* \* \*